(12) United States Patent
Azpitarte

(10) Patent No.: US 7,353,142 B2
(45) Date of Patent: Apr. 1, 2008

(54) ELECTRONIC MAINTENANCE RECORD FILE SYSTEM FOR EQUIPMENT SUCH AS A ELEVATORS

(76) Inventor: Jean-Patrick Azpitarte, 27, rue de la Pépinière, 75150 Le Chesnay (FR)

( * ) Notice: Subject to any disclaimer, the term of this patent is extended or adjusted under 35 U.S.C. 154(b) by 0 days.

(21) Appl. No.: 11/273,124

(22) Filed: Nov. 14, 2005

(65) Prior Publication Data

US 2006/0058980 A1    Mar. 16, 2006

Related U.S. Application Data

(62) Division of application No. 10/670,081, filed on Sep. 24, 2003, now Pat. No. 7,003,434.

(30) Foreign Application Priority Data

Sep. 26, 2002 (FR) .................................... 02 11932

(51) Int. Cl.
*G06F 11/30* (2006.01)
(52) U.S. Cl. ........................ 702/184; 702/182; 702/183
(58) Field of Classification Search ................ 702/182, 702/183, 184; 235/381, 382; 340/573.1
See application file for complete search history.

(56) References Cited

U.S. PATENT DOCUMENTS 5,436,613 A    7/1995   Ghosh et al.
6,170,742 B1   1/2001   Yacoob
6,370,582 B1   4/2002   Lim et al.
6,557,752 B1   5/2003   Yacoob

FOREIGN PATENT DOCUMENTS

FR           2814901       4/2002
WO        WO 97/48040     12/1997

OTHER PUBLICATIONS

Institut National de La Propriete Industrielle Preliminary Search Report.

*Primary Examiner*—John E. Barlow, Jr.
*Assistant Examiner*—Stephen J. Cherry
(74) *Attorney, Agent, or Firm*—Fish & Richardson P.C.

(57) ABSTRACT

An electronic maintenance record file system for facilities comprising local monitoring units, installed near the equipment to be maintained, a calculator made available to the maintenance company and connected to the local units using a transmission network to receive and process the information transmitted by the local units. Each local unit includes identification resources of the technician in charge of maintaining the associated equipment; time stamping resources of the start and end of each operation performed by the technician; data input resources of the description of the work performed during the technician's operation; and storage resources for storing, in the form of an electronic maintenance report file, the description of each operation performed on the associated equipment in relation with the identification information of the technician that performed the operation and the time stamp information of the start and end of the operation.

16 Claims, 4 Drawing Sheets

ELECTRONIC MAINTENANCE RECORD FILE SYSTEM FOR EQUIPMENT SUCH AS A ELEVATORS

CROSS-REFERENCE TO RELATED APPLICATIONS

This application is a divisional, and claims under 35 U.S.C. §120, the benefit of priority of U.S. patent application Ser. No. 10/670,081, filed Sep. 24, 2003 now U.S. Pat. No. 7,003,434, which claims priority from France Patent Application No. 02 11932, filed Sep. 26, 2002. The disclosure of the prior applications is considered part of, and is incorporated by reference in, the disclosure of this application.

FIELD OF THE INVENTION

This invention relates to the field of equipment maintenance.

It applies notably, but not exclusively, to equipment installed in buildings, such as elevators, forced ventilation, air conditioning and collective heating systems, parking garage automatic doors, etc.

BACKGROUND OF THE INVENTION

Currently, companies in charge of elevator maintenance are required to maintain and update, for each elevator, a maintenance record file that is available to the equipment owner for review. This maintenance record file is normally located on the elevator itself or at the maintenance operator's site. Currently, maintenance record files are manually completed by the technicians in charge of maintenance during each equipment operation. Sometimes, a technician may forget to complete the maintenance record file after a maintenance or repair operation. In addition, the information that he/she writes may be incomplete, or even insufficient to determine the exact nature of an operation. And in some cases, it may be incorrect or illegible.

Furthermore, the equipment owner does not have any way of checking the reliability of the information contained in this record file, nor that it contains each visit.

Maintenance companies also have oral and written operation reports that allow them to manage the activity of their technicians and count their on-site operations. Nevertheless, the manual nature of these reports does not provide any guarantee in terms of their completeness and accuracy.

The French patent application N° 00 12675 submitted by the applicant describes a remote management system for the maintenance of a set of equipment that comprises local monitoring units installed near the equipment to be monitored, each including means for detecting operation failures on the equipment; an equipment maintenance company calculator, connected to the local units through a telecommunications network for receiving and processing failure data transmitted by the local units; an equipment manager calculator that receives from the local units the same data than that of the maintenance company calculator. Each local unit is associated to monitored equipment and further comprises command means that allow a maintenance technician to signal the start and end of their operation on the related equipment. These events are then transmitted to the maintenance company and management calculators for storage.

Nevertheless, this system does not guarantee the completeness and accuracy of the information entered by maintenance technicians in the maintenance record file.

SUMMARY OF THE INVENTION

The purpose of this invention is to eliminate these inconveniences. This objective is obtained by using a system for the maintenance remote management of a set of equipment by a maintenance company. This system comprises local monitoring units, installed near the equipment, and a calculator made available to the maintenance company. This calculator is connected to local units through a transmission network for receiving and processing the data transmitted by the local units. Each local unit is associated to at least one piece of equipment and further comprises command means that allow a maintenance technician to signal the start and end of their operation on the related equipment. It also includes means for transmitting these events to the maintenance company calculator. The calculator includes means for storing all the data transmitted by the local units.

According to the invention, each local unit also includes means for identifying the technician responsible for the maintenance of the related equipment, means for time stamping the start and end of each operation performed by the identified technician using identification means, means for entering the description information of the work performed when the identified technician performs an operation, and access to the information storage means for storing, in the form of an electronic maintenance record file, the description information of each operation performed on the related equipment, in relation with the identification data of the technician that performed the operation, and timestamp information of the start and end of the operation.

According to a particular aspect of the invention, each local unit includes means for performing measurements regarding the operation of related equipment and thus detecting operation failures, and for transmitting the detected operation failures to the maintenance company calculator.

According to another aspect of the invention, each local unit comprises means for transmitting to the maintenance company calculator after an operation on the related equipment, the data relative to the operation that is stored in the storage media, the calculator that includes the means for storing the operation data received.

According to yet another aspect of the invention, this system further comprises a second calculator that receives from the local units the same information than that of the maintenance company calculator and includes means for storing the operation data received.

Favorably, the second calculator is connected to a digital data transmission network and provides the terminals connected to this network with access to the data stored in the storage media.

According to a particular aspect of the invention, the identification means include an element chosen from the set that includes a keyboard for entering the identification code of the maintenance technician, a reading system with or without electronic key or smart card or magnetic card contacts, which stores the technician identification code, and a biometric recognition system.

According to another aspect of the invention, each local unit includes means for detecting the presence of a person in the maintenance area of the related equipment, means for requesting the detected person to identify his/herself, and means for transmitting to the maintenance company calculator an identification error message if the detected individual is not identified using the identification means within a predefined period of time.

Favorably, this system includes telecommunications means to allow a maintenance company to communicate with a technician normally in charge of the maintenance of an equipment following receipt of an identification error message transmitted by the local unit associated with the equipment.

More preferably, the presence detection means include an element chosen from among the set that includes an electronic contact whose status is modified when a person arrives or leaves the equipment maintenance area, a movement detector, and a light detector for when a light is turned on in the maintenance area.

Also more preferably, the means for entering work description data include an element chosen from among the set that includes an input keyboard that can be detached or not from the local unit, an integrated keyboard in a command terminal that can be connected to the local unit through a fixed radio or infrared link, and a voice recognition system.

According to another aspect of the invention, each local unit includes means for transmitting to the maintenance company calculator an operation description data entry error message if the technician performing an operation does not enter description data within a predefined period of time.

Favorably, this system includes telecommunication means to allow the maintenance company to communicate with the identified technician during an operation, after receiving an operation description data entry error message transmitted by a local unit.

More preferably, at least one part of the local units include means that allow querying, either locally or remotely, the contents of the storage media that stores the maintenance data.

Favorably, the operation data stored in the storage media include the following for each operation:
the operation start and end dates,
the identification data of the technician that performed the operation,
an operation type,
action or function or part codes of the equipment element,
action type codes.

According to another aspect of the invention, the maintenance company calculator includes means for querying, sorting, and analyzing the operation data stored in the storage media for all the equipment. This allows analyzing the maintenance status of each piece of equipment, the maintenance company performance and the performance of each technician it employs.

BRIEF DESCRIPTION OF THE DRAWINGS

The preferred realization method of the invention is described below, as a non-limiting example, with reference to the attached diagrams in which.

DETAILED DESCRIPTION OF A PREFERRED EMBODIMENT

Figure 1:
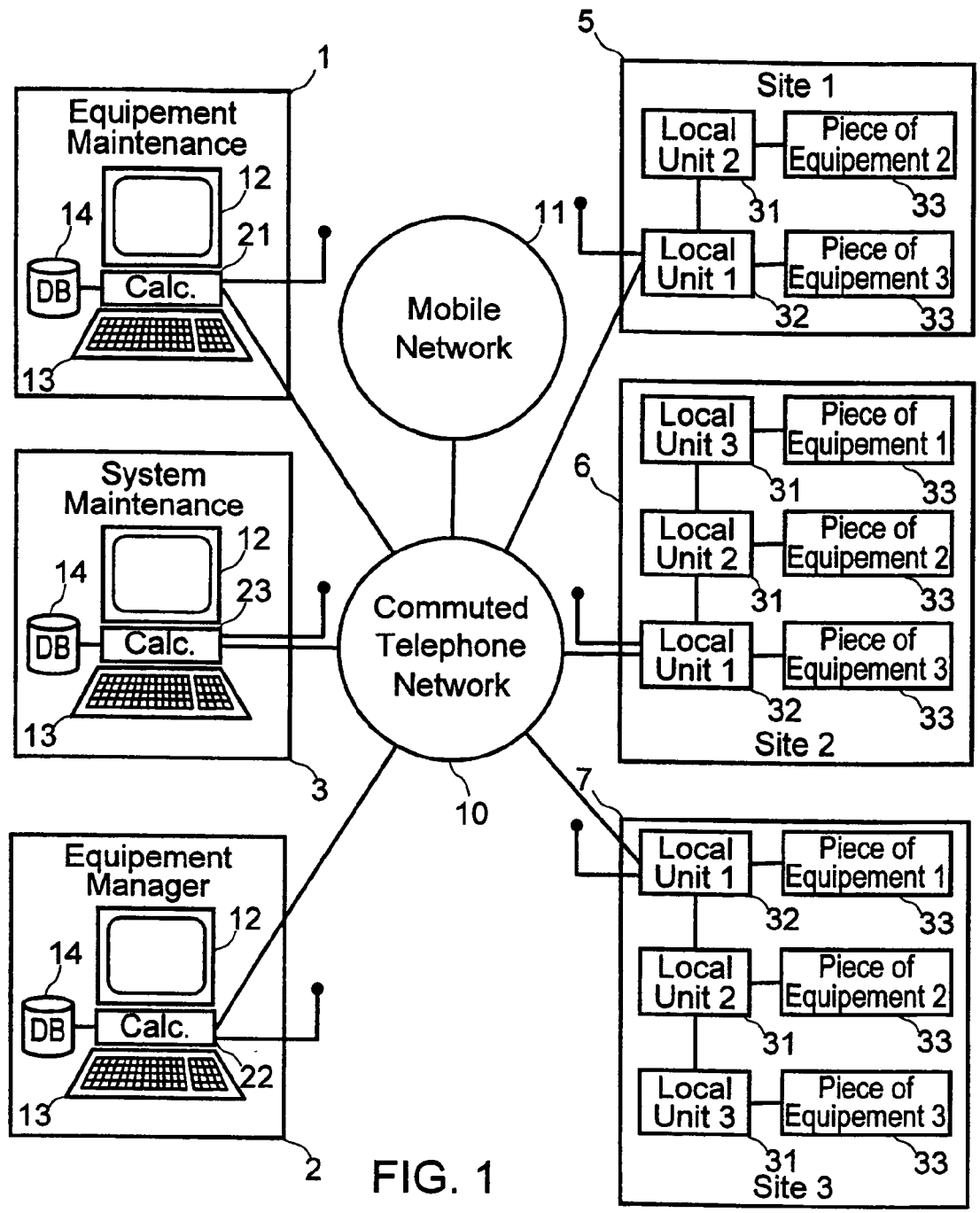
FIG. 1 illustrates an equipment maintenance management system according to the invention.

FIG. 1 represents a system designed to monitor and manage the maintenance of a set of equipment 33 arranged between remote sites 5, 6, 7. This equipment includes, for example, elevators, forced ventilation systems, air conditioning or heating systems, or even parking garage doors or barriers.

Each equipment 33 is associated with a local unit 31, 32, that is favorably designed to detect and process failures; at least one local unit 32 for each site 5, 6, 7 is equipped with a telephone transmitter for transmitting the detected failures to a maintenance company 1 of equipment 33 equipped for this purpose with a calculator 21; and possibly a manager 2 or user also equipped with a calculator 22, and that provides the maintenance company the mission to ensure the correct operation and maintenance of the equipment.

The monitoring system maintenance is ensured by a maintenance operator 3 of the system that is favorably equipped with a calculator 23 that receives the operation failures of local units 31, 32, also transmitted by these local units to the telephone network 10. All the transmitted data is also stored in a database 14.

The transmissions between local units 32 and calculators 21, 22, 23 are ensured through a fixed or switched telephone network 10, and favorably, through a radiotelephone network 11, such as a GSM network, linked to telephone network 10, in case a telephone connection cannot be established directly by the network 10.

Calculators 21, 22, 23 are equipped with a modem connected to network 10. They can also be equipped with an additional modem for receiving network 11 transmitted communications directly.

For money-saving purposes (to limit the number of telephone subscriptions), a single local unit 32 per site is equipped with a telephone transmitter and a GSM transmitter, the other local units 31 of the site are linked to local unit 32 that ensures the transmission of the failures and errors that it detects, as well as other information regarding the operation of the equipment.

Calculators 21, 22, 23 are, for example, servers or PC type computers equipped with the standard options: a keyboard 13, a monitor 12, and modems for establishing communication via networks 10 and 11.

Figure 2:
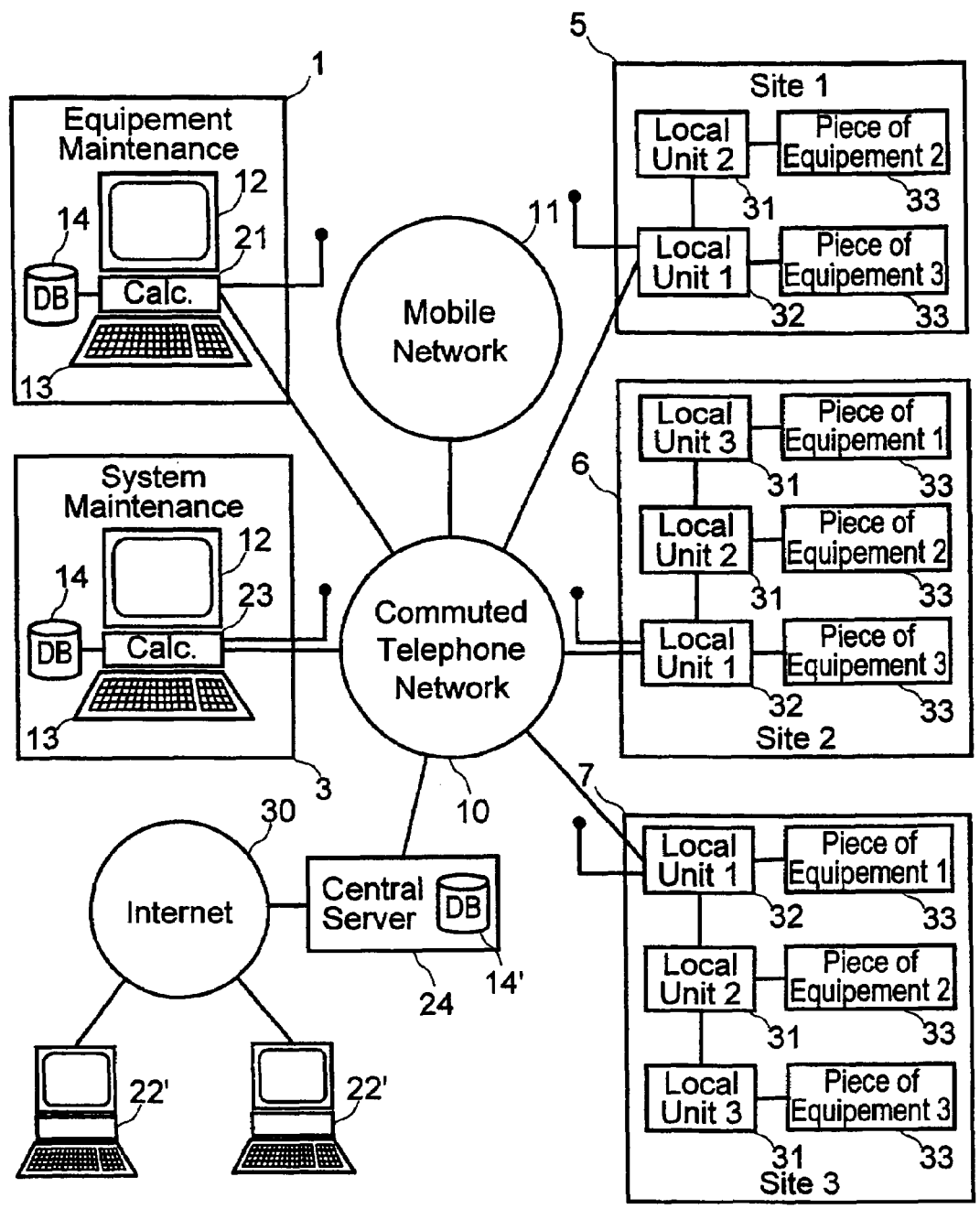
FIG. 2 shows a variant of the management system represented in FIG. 1.

If the equipment manager 2 does not have a specific calculator 22, for example, because he/she manages a small set of equipment, the system represented in FIG. 2 can be implemented. This system is identical to the one represented in FIG. 1, except for the fact that calculator 22 of equipment manager 2 is replaced with one or several terminals 22' linked to a data transmission network 33, such as the Internet. Furthermore, this system includes a central server 24 that also comprises a database 14' that contains all the data transmitted by the local units. This server is connected to network 10 (and possibly to network 11) to receive this data from the local units, and to network 30 to provide all the terminals 22' connected to this network with access to database 14' in return for providing a recognized identifier and password.

This way, equipment managers with recognized identifiers and passwords can access the data on equipment 33 using a terminal 32' equipped for this purpose with database query functions, such as querying, sorting, statistics, status changes, etc. functions.

Figure 3:
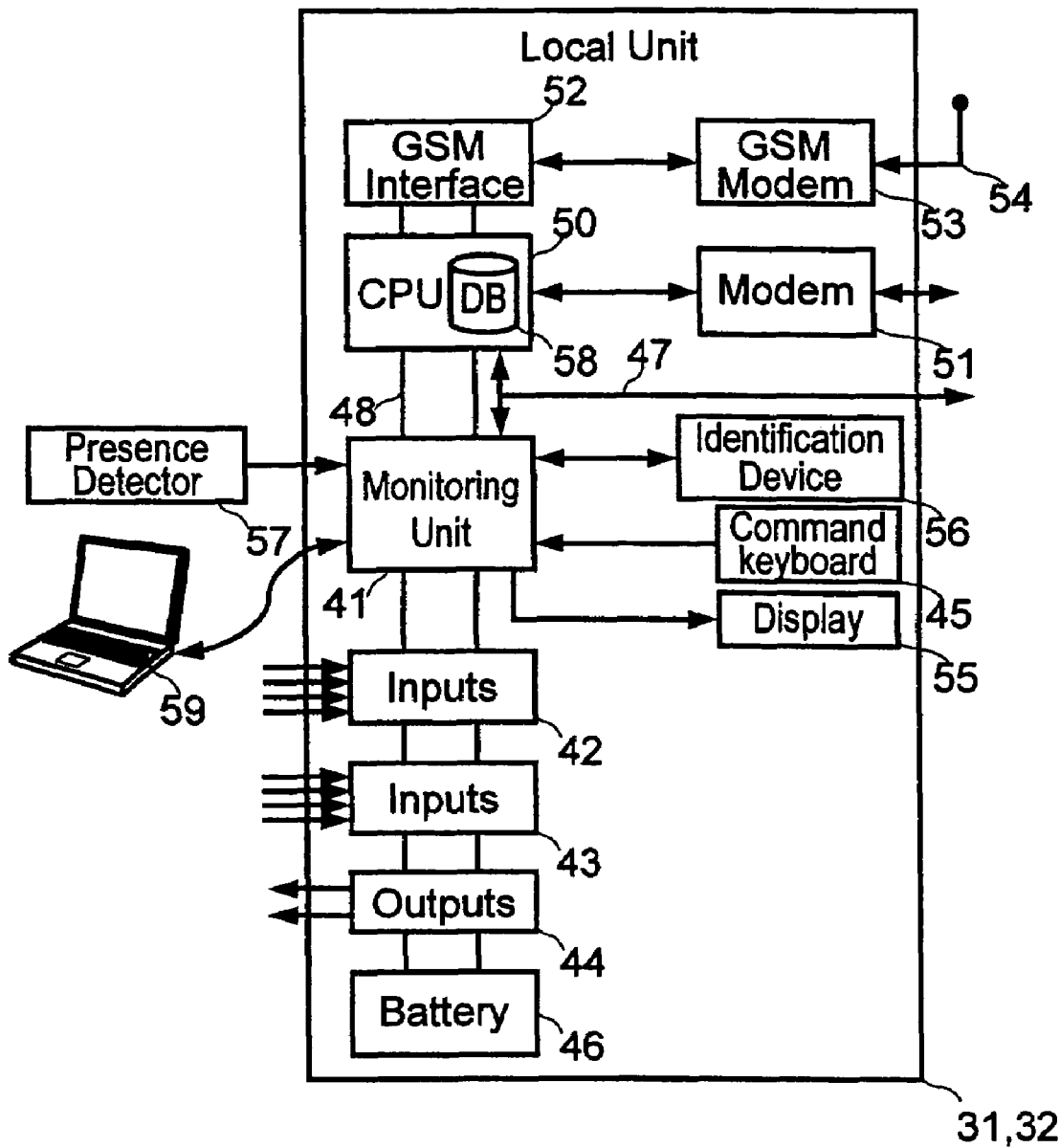
FIG. 3 illustrates in detail a local unit of the system represented in FIGS. 1 or 2.

In FIG. 3, each local unit 31, 32 includes a monitoring unit 41 comprised of a processor, for example a microcontroller, and memories; a power supply unit 46 designed to connect to the electrical network and comprising, for example, a backup battery with a recharge circuit, preferably input units 42, 43 comprising several channels (four, for example) for connecting to on-off or analogue measurement points or even detectors, arranged on the corresponding equipment 33 to be monitored; and output units 44 for applying on-off commands on the equipment 33. The set of these units 41 to 46 are interconnected by a parallel bus 48.

The output units 44 allow, for example, performing tests on the monitored equipment 33 by applying commands to this equipment and measuring its responses to these commands using input units 42, 43.

Monitoring unit 41 is connected to command and display elements 45, 55 arranged on the front panel of the housing of units 41 to 46 of the local unit and is equipped with a link 47, for example, a serial link, for communicating with the other local units 31, 32 installed on the same site. For this purpose, this serial link is connected to a connection plug outside the housing, designed to be connected with the other local units 31, 32 of the site.

The command and display elements 45, 55 include, for example, a keyboard 45 and a monitor 55, and are designed notably to allow a maintenance technician to signal the start and end of his/her operation on the corresponding equipment. This data is transmitted to the maintenance or management company's calculators 21, 22. These command and display elements can also be comprised of or completed by a portable terminal 59 made available to the technician. This terminal can be connected to monitoring unit 41 through a fixed infrared or radio link. These command and display elements can be replaced, in whole or in part, by a voice recognition and/or synthesis system.

If the local unit is linked to several pieces of equipment or if it must be installed in a place with difficult access or far away from the monitoring equipment, an offset command and display element linked to the local unit and installed next to the equipment can be used.

Furthermore, local units 32 equipped with transmission means further comprise a central unit 50 and an interface circuit 52 with a radiotelephone communication model 53, which are also connected to parallel bus 48. Central unit 50 is further connected to a modem 51 designed to connect to telephone network 10.

Central unit 50 also includes a processor, for example a microcontroller type processor, and memories. It connects to serial link 47 connected to monitoring unit 41. It further comprises a real-time timer for date stamping the various events that are detected by local units 31, 32 of the site and transmitted by serial link 47.

It performs a cyclical query of monitoring units 41 through serial link 47 to receive the information regarding the error and failure detected by the site's local units 31, 32, and transmits these failures to calculators 21, 22, and possibly 23, via modem 51 or interface circuit 52 and modem 53.

Radiotelephone communication interface circuit 52, also based on a microcontroller, ensures the modem 53 command and the transmission to this modem of the information received by bus 48. It can also be equipped with a backup battery and an associated battery charger for providing power supply to interface card 53 and modem 54, should the power supply be missing, or if power supply circuit 46 of units 41 or 50 fail. This way, interface circuit 53 can signal to calculator 23 that local unit 32 has failed. Modem 54, for example a GSM type modem, is connected to an antenna 54 outside the local unit 32 housing.

According to the invention, the system described further comprises means for updating, managing, and querying a maintenance record file for each piece of equipment 33.

For this purpose, each local unit 31, 32 also includes an identification device 56 to allow a maintenance technician to securely enter identification information when performing a maintenance operation on the corresponding equipment 33. Keyboard 45 is adapted to allow the maintenance technician to enter the data that describes the maintenance operation that was just performed. Furthermore, the central unit 50 processor includes storage means and is programmed to collect and store the maintenance information of equipment 33 of site 5, 6, 7 in a local database 58. This information includes the maintenance operation description data input and the technician identification data entered and formatted. Central unit 50 also includes means for transmitting this maintenance information to calculators 21 and 22, in relation with the equipment identification code, through modem 51 or interface 52 and modem 53.

Furthermore, calculators 21, 22, and 23 are programmed to receive this equipment maintenance data, process this data and store it in a respective database 14, designed for this purpose.

More precisely, the data formatted and stored by monitoring unit 41 favorably comprises the following elements for each operation on the corresponding equipment 33:

the type of operation that can take on the following values "repair," "maintenance," or "work" according to what the equipment is for the failed monitoring unit 41, in service or out of service due to work; it can also be forced by the technician to "call the client" to take into account an undetected malfunction (noise, flooding, fire, etc.) signaled by a user call;

the start and end date and hour of the operation that are determined by monitoring unit 41 and that correspond to the instances in which the technician signaled his/her arrival on site and departure from the site, respectively.

the actions performed that are entered by the maintenance technician in the form of action codes. Each of these codes is followed by, if necessary, one or several operation type codes (test, tuning, repair, replacement, etc.); and the identification code of the technician that performed the operation.

Local unit 31 can also include means for locally or remotely (through a telemaintenance link) querying of the contents of database 58 that stores the maintenance information of the corresponding equipment 33.

Identification device 56 is, for example, comprise an electronic lock designed for contact and non contact detection; an electronic key code that identifies the maintenance technician, either using a reader with or without smart card and/or magnetic card contact that stores the technician's identification code o using an infrared or radio receiver designed to receive the data identifying the technician and transmitted using a remote control or command terminal 59. It can also comprise a biometric recognition system such as voice recognition, digital fingerprint, or eyes can designed to recognize the identify of the technicians in charge of maintaining the equipment.

Of course, identification device 56 may not be required. The identification of the technician can be made by entering an identification code and password using keyboard 45.

Moreover, one of the problems solved by the invention is ensuring that, for each operation performed by a maintenance technician on an equipment 33, a presence validation and descriptive data input of the maintenance operation performed on the equipment is applied. Indeed, the technician may forget to provide the system with a description of their operation. To solve this issue, the invention provides for the use of another detection device 57 that detects the presence of a person at the site where the equipment elements can be accessed. In the case of a elevator, this detection device, for example, includes an electronic or magnetic contact on the door or machinery trapdoor; a movement detector in the machinery; or a light detector of the electrical lighting in the machinery.

In the case of the detection of the presence of a person by detection device 57, monitoring unit 41 goes on standby and awaits the identification information of the person detected and emits a sound and/or visual signal indicating that the person detected must identify his/herself. If, after a programmed amount of time, the monitoring unit does not receive identification information from identification device 56, it generates an error signal that it sends to calculators 21, 22 indicating that an unidentified person has entered the equipment operation area. This message is transmitted in real time to calculator 21, and in real time or deferred to calculator 22. This way, the maintenance operator 1 in charge can remind the technician using the usual communications means, such as the technician's mobile telephone, and manager 2 of the equipment can count the number of failures in the required procedure and the need to apply penalties to the maintenance operator.

Figure 4:
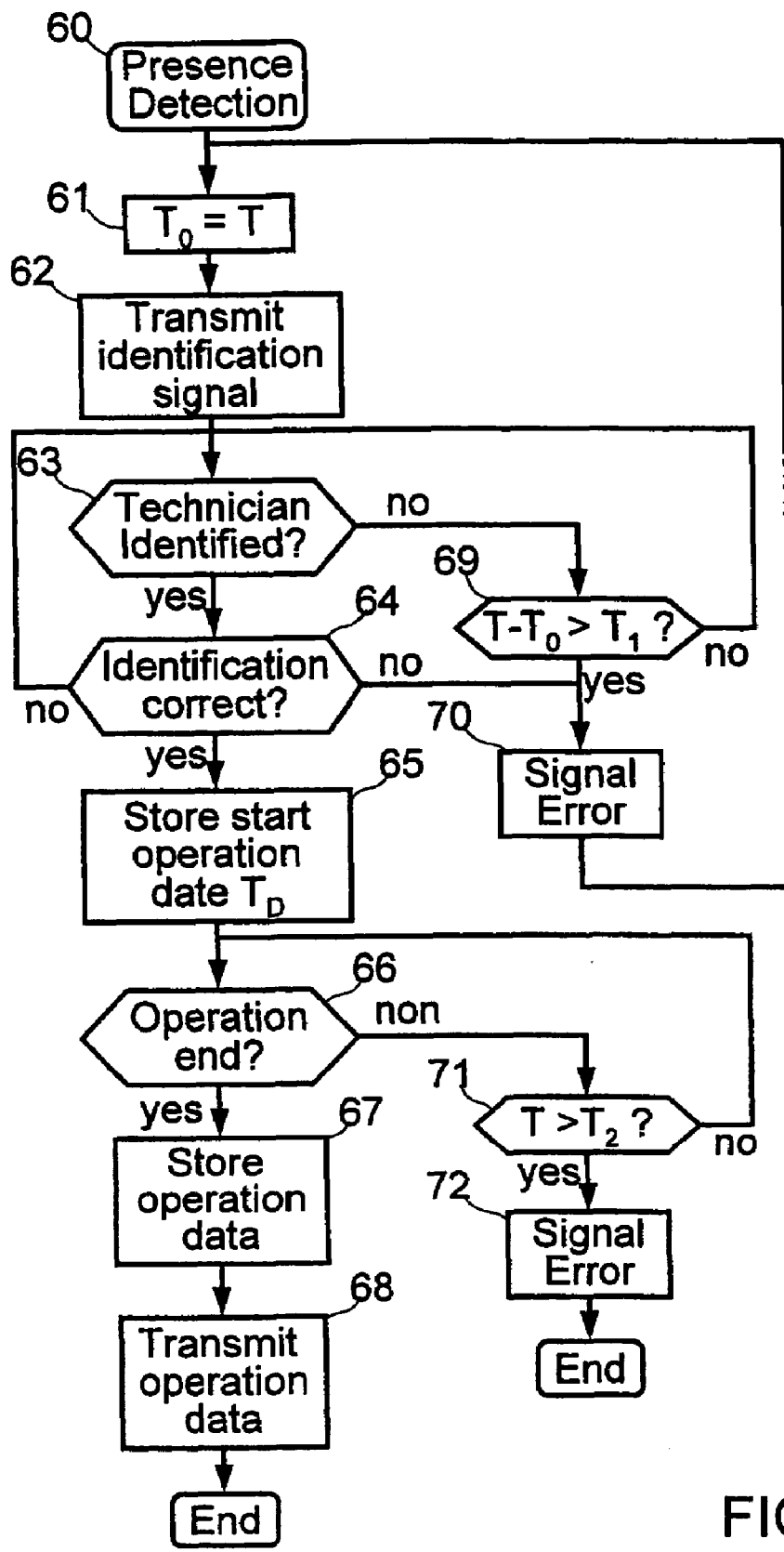
FIG. 4 illustrates in the form of a flow-chart the operation of a local unit as represented in FIG. 3.

The system, according to the invention, operates as illustrated in FIG. 4. This Figure illustrates, in the form of a flow-chart, a procedure 60 that is executed by monitoring unit 41 of a local unit 31, 32 when the detection device detects the presence 57 of a person in the corresponding equipment site.

Firstly, this procedure includes a detection hour storage step 61, followed by a signal transmission trigger step 62 that warns the technician that he/she must identify his/herself If the technician does not identify hem/herself within a predefined period of time $T_1$ (steps 63, 64, and 69), monitoring unit 41 transmits an error message to calculator 21 of maintenance company 1 (step 70).

If during steps 63 and 64 monitoring unit 41 identifies the technician (identification data correctly provided), it stores during step 65 the current date and hour as the operation start date, associated with the technician identification information. If the identification information provided is incorrect (step 64), the monitoring unit prompts the person to provide new identification information. If, after a predefined number of tries, the monitoring unit has not received the correct identification information, it signals this error by transmitting a message to calculator 21 and possibly to calculator 22.

If the detected technician is correctly identified, monitoring unit 41 then determines the type of operation ("repair"/"maintenance"/"work") according to the equipment status (in service, out of service, or out of service due to work). Moreover, if the equipment is in service, the technician can force the type of operation "requested by the client" by entering a code defined for this purpose and indicating that it is an operation triggered by a call from a user of the equipment.

At the end of his/her operation, the technician must enter its description and signal his/her departure from the site. This description contains codes of actions or of functions or equipment parts affected by the operation, these codes being defined in a coded operation directory, and action type codes (test, tuning, repair, replacement) associated with the action, function or parts codes entered.

During state 66, the signaling of the technician's departure triggers the validation of the operation information entered and a timestamp by monitoring unit 41, which allows determining the duration of the operation.

Sound or visual signals can be used to remind the technician to describe his/her operation and validate the description information of the operation.

The technician departure signal also triggers the formatting and entering during step 67 of the maintenance information entered and determined in local database 58, then the transmission to step 68 of this information in relation with an equipment identification code to calculators 21, 22, and 23.

Furthermore, if at a certain hour $T_2$ of the day on which the maintenance operations must normally be completed (step 71) the technician has not yet signaled the end of his/her operation (step 66), the monitoring unit 41 signals this error during step 72 to calculators 21 and 22 by transmitting a message containing the identification code of the corresponding equipment and the identification code of the technician provided at the beginning of the operation. This way, the maintenance company can also call the technician so that he/she describe and validate his/her operation at the local unit of the equipment on which the operation was performed.

Once this operation information is received, calculators 21 and 22 store this data in their respective databases 14. Moreover, calculators 21 and 22 include query functions to be applied to this database for extracting the maintenance record file of any given equipment 33; this is, the information collected in the database 14 regarding all the operations performed on the equipment, and statistics creation functions using the maintenance data of all the equipment thus monitored.

Calculators 21 and 22 further comprise database 14 information analysis means for accurately evaluating whether maintenance company 1 respects its contractual commitments. For this purpose, analysis means are designed to control, in particular, the following:

periodicity, duration, and content of maintenance operations carrying out of mandatory checks (for example, elevator parachute check)

the nature of failure and repair actions performed by the maintenance company the monetary amounts invested by the maintenance company to ensure the correct operation of equipment with respect to the total guarantee that may be included in the maintenance contract, etc.

These analysis means further allow quickly and accurately obtaining the status of each equipment and the technical performance of the maintenance company.

Moreover, calculator 21 of the maintenance company includes means for determining the following using the operation data stored in the database 14:

the number of failures per time unit and per maintenance technician the average duration of an operation or failure and the possible deviations with this average duration recurring failures statistics about the operations performed and about the number of replacement parts, etc.

the work to be done and the scheduled dates of this work budget excesses with respect to budgets forecasted in maintenance contracts performance evaluations of maintenance technicians, etc.

What is claimed is:

1. A system for remote maintenance management of equipment by a maintenance company, said system comprising local monitoring units fixedly installed near and dedicated to at least one piece of said equipment, and a maintenance company calculator connected to said local monitoring units by means of a transmission network, each of said local monitoring units comprising:
 monitoring means for real-time detecting and processing of failures occurring in said at least one piece of equipment to which the local monitoring unit is dedicated,
 identification means for identifying a technician when starting an operation on the dedicated piece of said equipment,
 command means for allowing said maintenance technician identified using identification means, to signal a start and end events of said operation on the dedicated piece of said equipment,
 time stamping means for time stamping said start and end events,
 data entry means for introducing data describing work done during said operation performed by said identified technician, and
 data storage means for storing in the form of an electronic maintenance record file said data describing work done during said operation on the dedicated piece of equipment in relation with identification of the technician and timestamp information of the start and end events of the operation.

2. The system according to claim 1, wherein each local unit further comprises means for performing measurements on the dedicated equipment in order to detect operation failures, and for transmitting the detected operation failures to the maintenance company calculator.

3. The system according to claim 1, wherein each local unit further comprises means for transmitting to the maintenance company calculator information stored in said storage means regarding an operation following said operation on the dedicated equipment, said calculator including means for storing the operation information received.

4. The system according to claim 3, further comprising a second calculator for receiving from said local units the operation information transmitted to the maintenance company calculator, said second calculator comprising means for storing the operation information received.

5. The system according to claim 4, wherein said second calculator is connected to a digital data transmission network and provides terminals connected to said network with access to the data stored in said storage means.

6. The system according to claim 3, wherein the maintenance company calculator further comprises means for querying, sorting, and analyzing the operation data stored in the storage media for all the equipment, in order to determine a maintenance status of each piece of said equipment, a maintenance company performance and a performance of each technician employed by said maintenance company.

7. The system according to claim 1, wherein said identification means include an element chosen from the set including a keyboard for entering an identification code of the maintenance technician, reading systems with and without electronic key or smart card or magnetic card contacts, which store a technician identification code, and a biometric recognition system.

8. The system according to claim 1, wherein each local unit further comprises means for detecting a presence of a person in a maintenance area of the associated piece of said equipment, means for requesting the detected person to identify his/herself, and means for transmitting to the maintenance company calculator an identification error message if the detected person is not identified using the identification means within a predefined period of time.

9. The system according to claim 8, further comprising telecommunication means for allowing a maintenance company to communicate with a technician normally in charge of maintaining a piece of said equipment following receipt of an identification error message transmitted by the local unit dedicated to said piece of said equipment.

10. The system according to claim 8, wherein said presence detection means comprises an element chosen from the set comprising an electrical contact whose status is modified when a person enters or leaved the equipment maintenance area, a movement detector, and a light detector of an electrical lighting in the maintenance area.

11. The system according to claim 8, wherein each local unit further comprises means for transmitting to the maintenance company calculator an identification error message if the detected person is not identified using the identification means within a predefined period of time.

12. The system according to claim 11 further comprising telecommunication means for allowing the maintenance company to communicate with the identified technician during an operation, after receiving an operation description data entry error message transmitted by a local unit.

13. The system according to claim 1, wherein means for introducing a description of the work include an element chosen from the set comprising an input keyboard detachable or not from the local unit, and integrated keyboard in a command terminal that can be connected to the local unit through a fixed radio or infrared link, and a voice recognition system.

14. The system according to claim 1, wherein at least some of said local units comprise means for locally or remotely querying content of said storage media storing said operation information.

15. The system according to claim 1, wherein the operation information stored in the storage media include for each operation at least one of the following items:
 operation start and end dates,
 identification data of the technician that performed the operation,
 an operation type,
 action or function or part codes of the equipment element,
 action type codes.

16. The system according to claim 1, wherein each of said local monitoring units further comprises:
 means for transmitting failure and maintenance information to said maintenance company calculator, wherein said maintenance company calculator comprises means for receiving, storing and processing all information transmitted by said local monitoring units.

* * * * *